United States Patent
Mukherjee et al.

(10) Patent No.: US 11,662,795 B2
(45) Date of Patent: May 30, 2023

(54) SYSTEM AND METHOD FOR ENDING A POWER REDUCTION PROTOCOL IN AN INFORMATION HANDLING SYSTEM ENVIRONMENT

(71) Applicant: Dell Products L.P., Round Rock, TX (US)

(72) Inventors: Rishi Mukherjee, Bangalore (IN); Shivendra Katiyar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 17/488,721

(22) Filed: Sep. 29, 2021

(65) Prior Publication Data

US 2023/0099693 A1 Mar. 30, 2023

(51) Int. Cl.
*G06F 1/28* (2006.01)
*G06F 1/30* (2006.01)

(52) U.S. Cl.
CPC . *G06F 1/30* (2013.01); *G06F 1/28* (2013.01)

(58) Field of Classification Search
CPC ..................................... G06F 1/28; G06F 1/30
See application file for complete search history.

(56) References Cited

U.S. PATENT DOCUMENTS

| | | | | |
|---|---|---|---|---|
| 5,483,656 A | * | 1/1996 | Oprescu | G06F 1/3253 700/297 |
| 2013/0024708 A1 | * | 1/2013 | Goodrum | G06F 1/324 713/323 |
| 2014/0129855 A1 | * | 5/2014 | Hamdi | G06F 1/266 713/320 |
| 2015/0006925 A1 | * | 1/2015 | Branover | G06F 1/206 713/320 |
| 2015/0185799 A1 | * | 7/2015 | Robles | G06F 1/3225 713/320 |
| 2017/0085084 A1 | * | 3/2017 | Daly | G06F 1/3215 |
| 2017/0177059 A1 | * | 6/2017 | Fan | G06F 1/3287 |
| 2018/0246554 A1 | * | 8/2018 | Egger | G06F 1/3203 |

* cited by examiner

*Primary Examiner* — Mark A Connolly
(74) *Attorney, Agent, or Firm* — Chamberlain, Hrdlicka, White, Williams & Aughtry

(57) ABSTRACT

A method for managing power in an information handling system (IHS) environment includes initiating, by a power management console, an end to an emergency power reduction protocol on the IHS environment, based on the end to the emergency power reduction protocol, selecting a device priority group, wherein: the device priority group comprises a plurality of IHS devices, and the device priority group is selected based on a priority of the device priority group, obtaining a power usage estimation for the device priority group, and applying a power limit to the device priority group based on available power to the IHS environment and the power usage estimation.

20 Claims, 7 Drawing Sheets

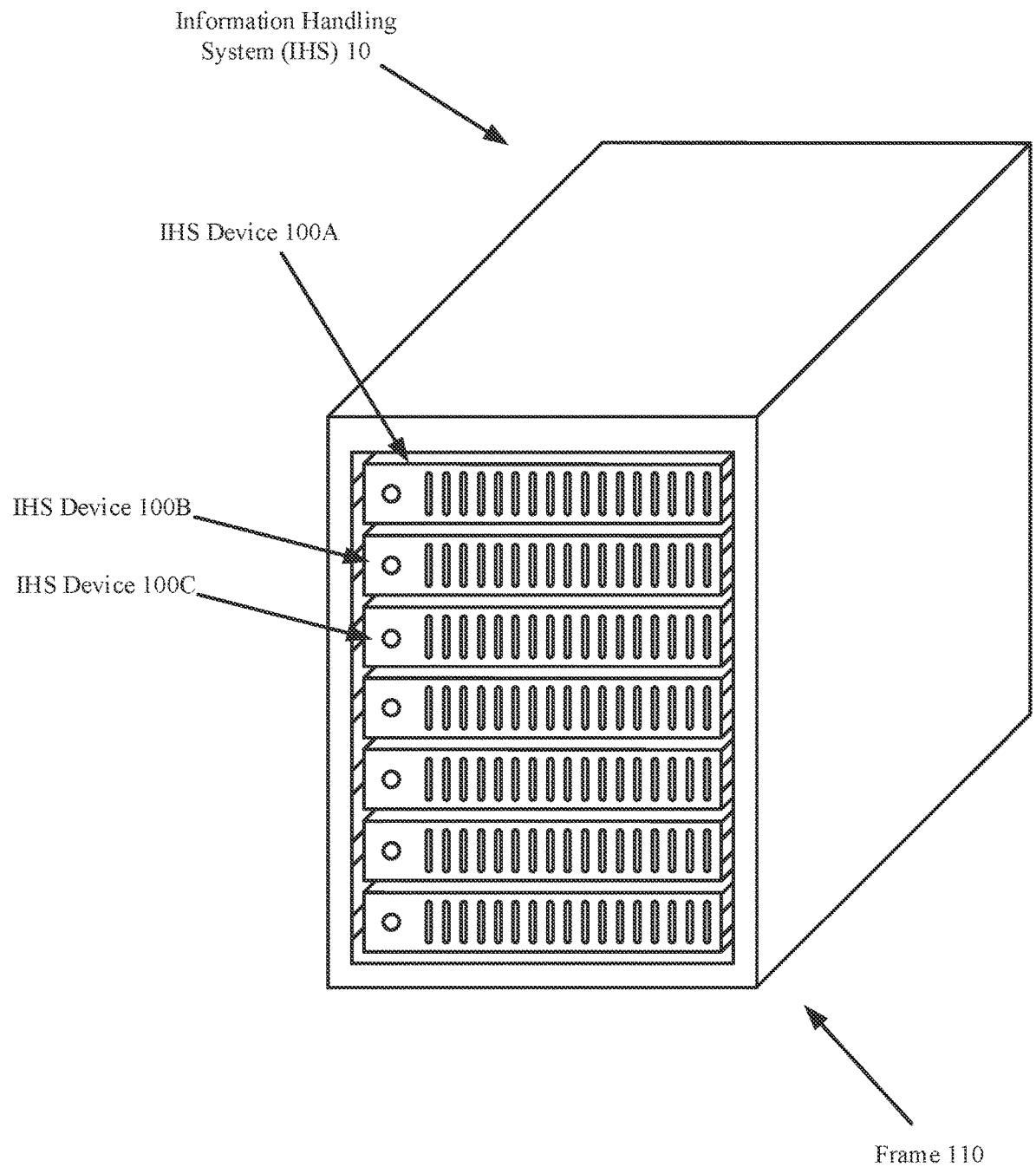
FIG. 1.1

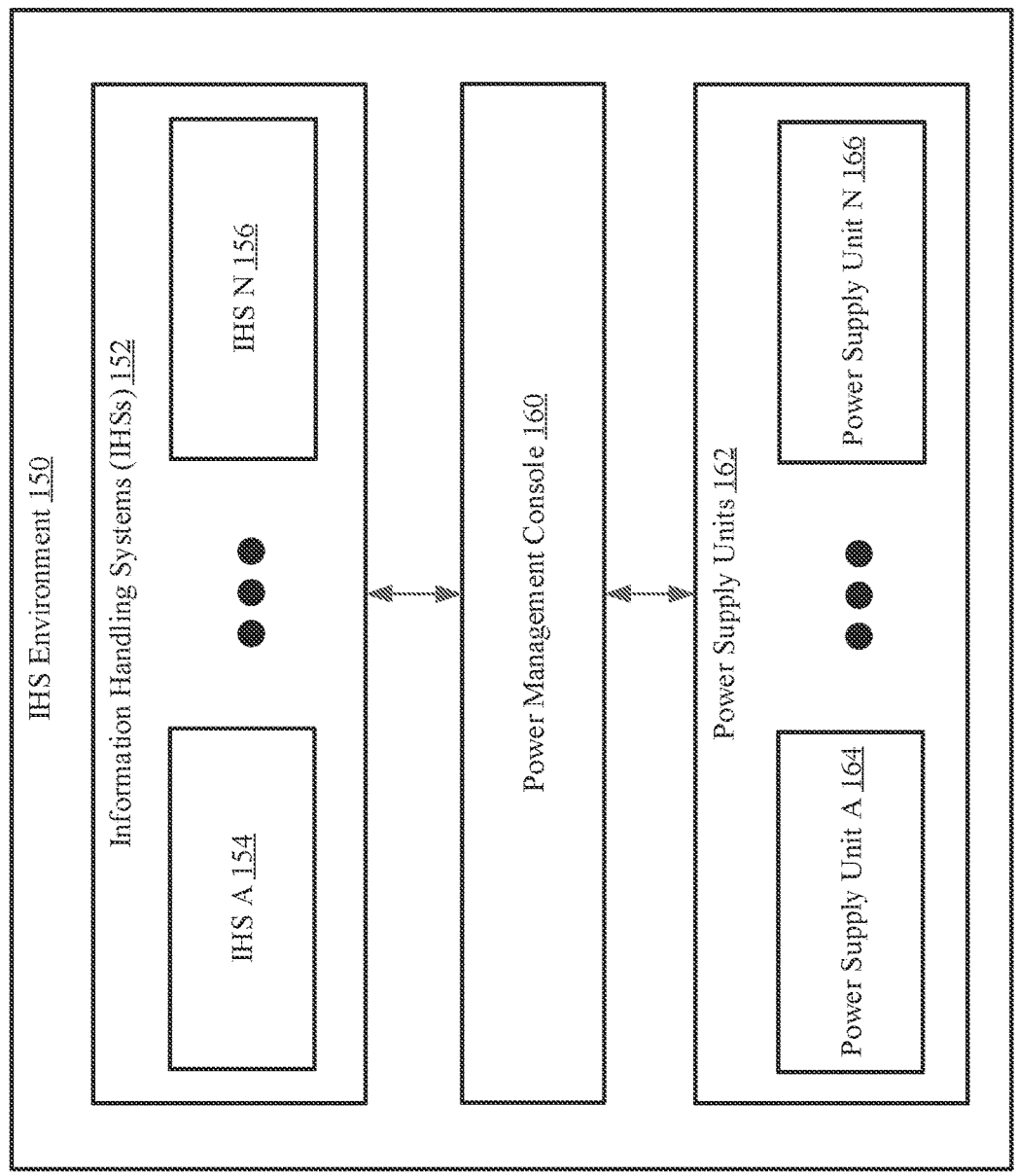
FIG. 1.2

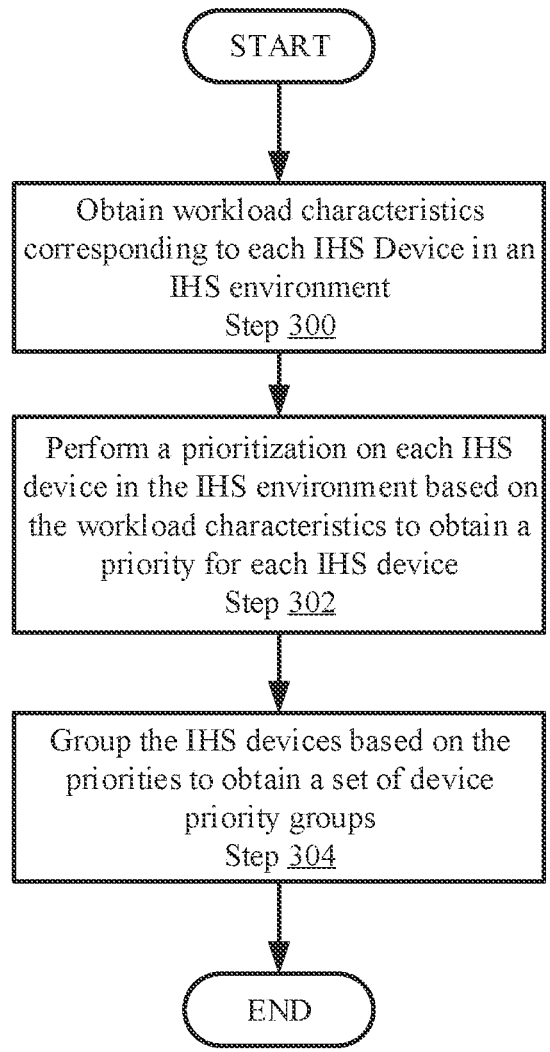
FIG. 3.1

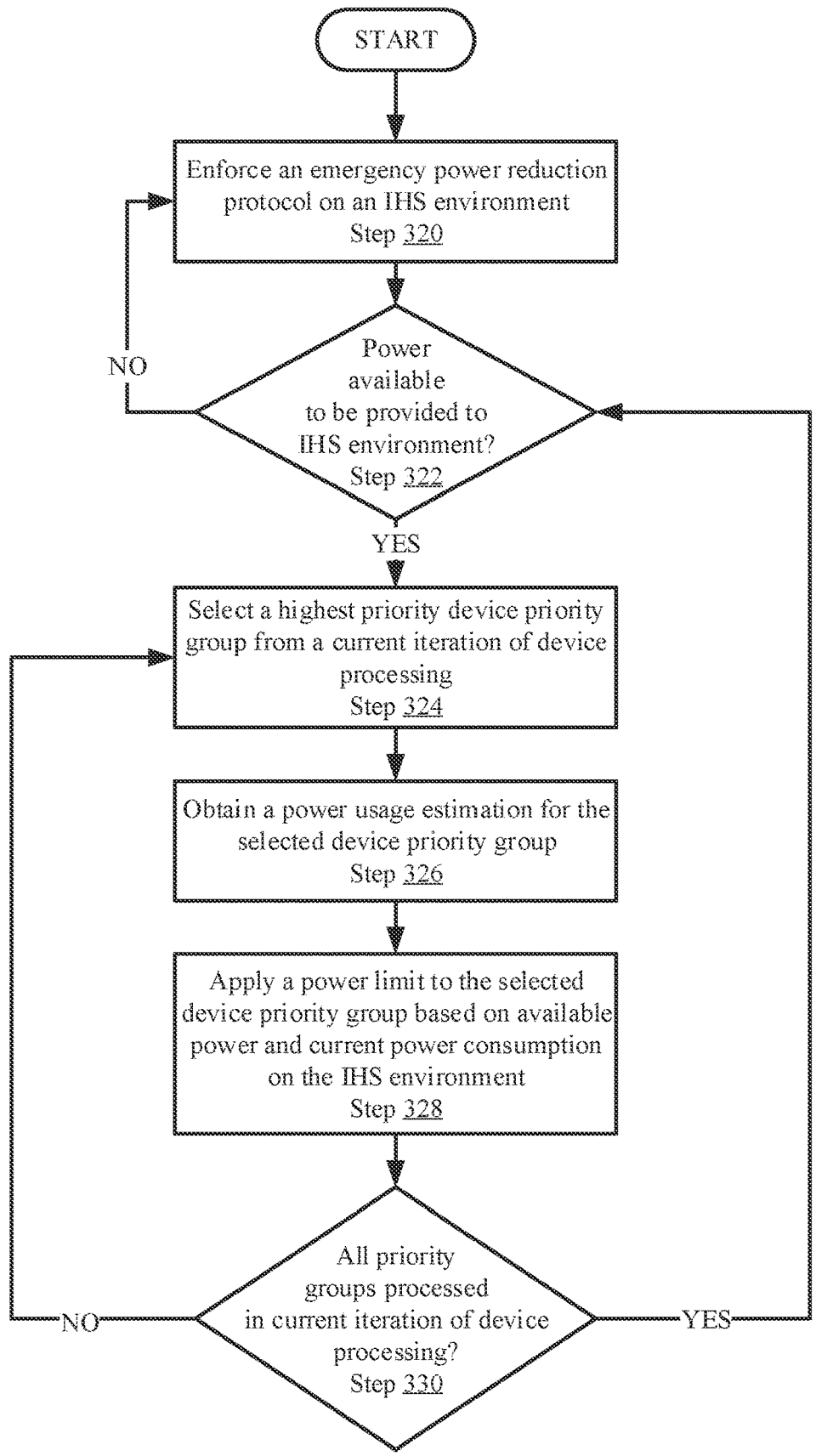
FIG. 3.2

SYSTEM AND METHOD FOR ENDING A POWER REDUCTION PROTOCOL IN AN INFORMATION HANDLING SYSTEM ENVIRONMENT

BACKGROUND

Information handling systems may include any number of devices (e.g., computing devices). The information handling systems may be powered by power supply units. During operation, one or more of the power supply units may fail in providing power, resulting in reduced power provided to the information handing system. The information handling system may respond to the reduced power by reducing the power provided to the computing devices.

SUMMARY

In general, in one aspect, the invention relates to a method for managing power for an information handling system (IHS) environment. The method includes initiating, by a power management console, an end to an emergency power reduction protocol on the IHS environment, based on the end to the emergency power reduction protocol, selecting a device priority group, wherein: the device priority group comprises a plurality of IHS devices, and the device priority group is selected based on a priority of the device priority group, obtaining a power usage estimation for the device priority group, and applying a power limit to the device priority group based on available power to the IHS environment and the power usage estimation.

In general, in one aspect, the invention relates to a non-transitory computer readable medium comprising computer readable program code, which when executed by a computer processor enables the computer processor to perform a method for managing power provided to an information handling system (IHS) environment. The method includes initiating, by a power management console, an end to an emergency power reduction protocol on the IHS environment, based on the end to the emergency power reduction protocol, selecting a device priority group, wherein: the device priority group comprises a plurality of IHS devices, and the device priority group is selected based on a priority of the device priority group, obtaining a power usage estimation for the device priority group, and applying a power limit to the device priority group based on available power to the IHS environment and the power usage estimation.

In general, in one aspect, the invention relates to a system that includes an information handling system (IHS) environment, a plurality of power supply units (PSUs), and a power management console, wherein the power management console is programmed to: initiate an end to an emergency power reduction protocol on the IHS environment, based on the end to the emergency power reduction protocol, select a device priority group, wherein: the device priority group comprises the plurality of IHS devices, and the device priority group is selected based on a priority of the device priority group, obtain a power usage estimation for the device priority group, and apply a power limit to the device priority group based on available power to the IHS environment and the power usage estimation.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of an information handling system (IHS) in accordance with one or more embodiments of the invention.

FIG. 1.2 shows a diagram of an IHS environment in accordance with one or more embodiments of the invention.

FIG. 3.1 shows a flowchart of a method of grouping IHS devices in accordance with one or more embodiments of the invention.

FIG. 3.2 shows a flowchart of a method of managing power in an IHS environment in accordance with one or more embodiments of the invention.

DETAILED DESCRIPTION

Figure 2:
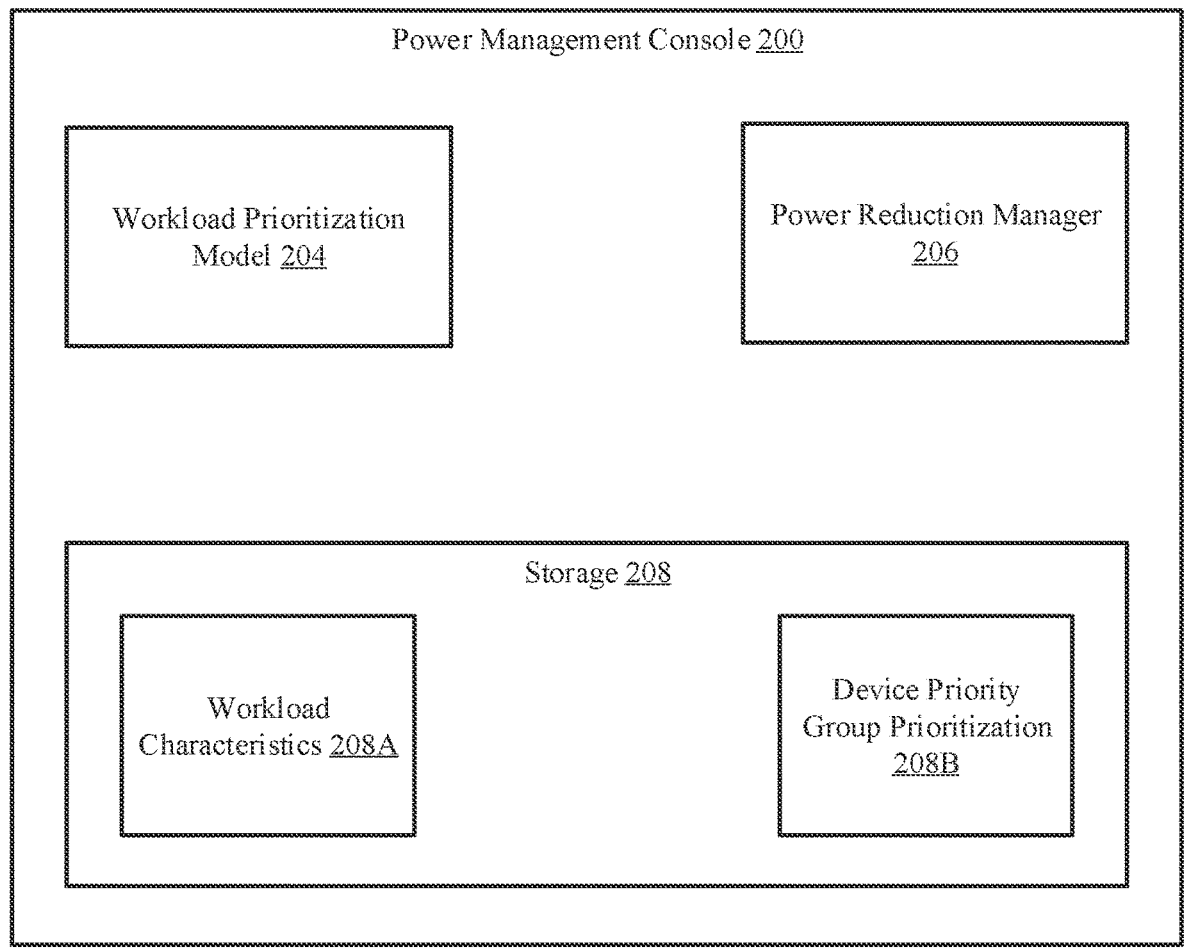
FIG. 2 shows a diagram of a power management console in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing components of an information handling system. An information handling system (IHS) may be a system that provides computer implemented services. These services may include, for example, database services, electronic communication services, data storage services, etc.

To provide these services, the information handling system may include one or more IHS devices. The IHS devices may include any number of computing components that facilitate providing of the services of the information handling system. The computing components may include, for example, processors, memory modules, circuit cards that interconnect these components, etc.

In an IHS environment that is provided multiple sources of power (e.g., by power supply units (PSUs)), failure by any one or more PSUs may result in the need for an emergency power reduction protocol, which reduces the power provided to the IHS devices. This may result in IHS devices utilizing power as available. As power provided by PSUs is restored, the emergency power reduction protocol may be ended for any number of IHS devices. The ending of the emergency power reduction protocol may enable IHS devices to utilize this additional available power. The introduction of additional electrical load applied to the IHS environment may result in unexpected electrical issues such as, e.g., power surges, which may damage the circuitry of the IHS devices and/or the power application to the IHS environment.

Embodiments of the invention relate to managing the power provided to an IHS environment following an end to an emergency power reduction protocol. The power may be managed by a power management console. The power management console may obtain workload characteristics corresponding to each IHS device. Based on the workload characteristics and/or usage information of the IHS devices, the IHS devices may be grouped into device priority groups. Each device priority group may correspond to a priority. Device priority groups with high priority are processed first to be provided power first with a power limit (also referred to as a power cap) that is less restricting than that of subsequent device priority groups.

As an emergency power reduction protocol is enforced, the amount of power provided to the IHS environment may be limited. This may be due to the available power provided to the IHS environment by PSUs. For example, one or more PSUs may experience a failure, and is thus unable to power any of the IHS environment. However, at a later point in time, the PSUs may become operational, and the total amount of power available to be provided to the IHS environment may be increased. As such, an end to the emergency power reduction protocol may be initiated by the power management protocol. To prevent overloading the IHS environment, the power management console manages the power provided to the IHS devices such that the more prioritized IHS devices are powered first. Further, power limits may be provided to the IHS devices such that the amount of powered allowed to be consumed (e.g., relative to the total available power) by each IHS device is limited.

As the IHS devices utilize the power following the end of the emergency power management protocol, the power management console may recalibrate the power limits implemented on the IHS devices. For example, if an IHS device is utilizing less power than was previously estimated by the power management console, the power limit may be lowered to the IHS device, and increased to a second IHS device that requires more power than the power limit would allow the second IHS device to use.

FIG. 1.1 shows an information handling system (10) in accordance with one or more embodiments of the invention. The system may include a frame (110) and any number of IHS devices (e.g., 100A, 100B, 100C).

The frame (110) may be a mechanical structure that enables chassis to be positioned with respect to one another. For example, the frame (110) may be a rack mount enclosure that enables chassis to be disposed within it. The frame (110) may be implemented as other types of structures adapted to house, position, orient, and/or otherwise physically, mechanically, electrically, and/or thermally manage chassis. By managing the chassis, the frame (110) may enable multiple chassis to be densely packed in space without negatively impacting the operation of the information handling system (10).

An IHS device (e.g., 100A) may be a mechanical structure for housing components of an information handling system. For example, an IHS device may be implemented as a rack mountable enclosure for housing components of the IHS (10). The IHS device (e.g., a chassis) may be adapted to be disposed within the frame (110) and/or utilize services provided by the frame (110) and/or other devices.

Any number of components may be disposed in each of the respective IHS device (e.g., 100A, 100B, 100C). These components may be portions of computing devices that provide computer implemented services, discussed in greater detail below.

Additionally, while an IHS device (100A, 100B, 100C) of the IHS (10) is illustrated as having a specific form factor (e.g., rack mount), an IHS device (100A, 100B, 100C) in accordance with embodiments of the invention may have different form factors without departing from the invention.

To manage the power console, an IHS environment in accordance with one or more embodiments of the invention is shown in FIG. 1.2.

FIG. 1.2 shows a diagram of an IHS environment in accordance with one or more embodiments of the invention. The IHS environment (150) includes any number of IHSs (152), any number of power supply units (162), and a power management console (160). The IHS environment (150) may include additional, fewer, and/or different components without departing from the invention.

To manage the power provided to it, the IHS environment (150) may include a power management console (160). The power management console (160) may manage the power by monitoring the workloads applied to each IHS device in the IHSs (154, 156) and processing workload characteristics corresponding to the workloads to obtain prioritizations of the IHS devices. The workload characteristics may be processed in accordance with FIG. 3.1. Further, the power management console (160) may provide the power to the IHSs (152) based on the prioritizations of the IHS devices. The power may be managed, e.g., in accordance with FIG. 3.2.

While illustrated in FIG. 1.2 as a physical structure, as will be discussed with respect to FIG. 2, the power management console (160) may be implemented as a logical entity (e.g., a program executing using computing components). For example, a computing device disposed in a chassis may host a program that provides the functionality of the power management console (160).

To enable, at least in part, the power management console (160) to provide its functionality, the chassis (100A) may include one or more PSUs (162). Each of the PSUs (164, 166) include functionality for providing power to the components of the IHSs (152). The PSUs (162) may include, for example, the circuitry required to enable the power to be supplied to the aforementioned components (e.g., the power management console (160) and the IHSs (152). Examples of PSUs (162) include, but are not limited to: alternating current (AC) power supplied from a power plant to a building housing the IHS device (100A), a battery operatively connected to the PSUs (162), a fuel cell, a device that converts mechanical motion into electrical power, and a capacitor.

While illustrated as a separate component of an IHS, the power management console (160) may be implemented as a component of one of the IHSs (e.g., 154) without departing from the invention.

While the IHS environment (150) of FIG. 1.2 has been illustrated as including a limited number of specific components, the IHS environment (150) in accordance with one or more embodiments of the invention may include additional, fewer, and/or different components without departing from the invention.

To manage the operation of a chassis, an IHS in accordance with embodiments of the invention may include a power management console. Turning to FIG. 2, FIG. 2 shows a diagram of a power management console (200) in accordance with one or more embodiments of the invention. The power management console (160) illustrated in FIG. 1.2 may be similar to the power management console (200) of FIG. 2.

As discussed above, the power management console (200) may manage the power provided to the IHS environment. The power management console (200) may include a workload prioritization model (206), a power reduction manager (208), and storage (208). The power management console (200) may include additional, fewer, and/or different components without departing from the invention.

In one or more embodiments of the invention, the power management console (200) is implemented using one or more computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the power management console (200) described through this application and all, or a portion, of the methods illustrated in FIGS. 3.1-3.2. The power management console (200) may be implemented using other types of computing devices without departing from the invention. For additional details regarding computing devices, refer to FIG. 5.

In one or more embodiments of the invention, the power management console (200) is implemented using distributed computing devices. As used herein, a distributed computing device refers to functionality provided by a logical device that utilizes the computing resources of one or more separate and/or distinct computing devices. For example, in one or more embodiments of the invention, the power management console (200) is implemented using distributed devices that include components distributed across any number of separate and/or distinct computing devices. In such a scenario, the functionality of the power management console (200) may be performed by multiple, different computing devices without departing from the invention.

In one or more embodiments of the invention, the power management console (200) is implemented using a hardware device including circuitry. The power management console (200) may be implemented using, for example, a digital signal processor, a field programmable gate array, or an application specific integrated circuit. The power management console (200) may be implemented using other types of hardware devices without departing from the invention.

In one or more embodiments of the invention, the power management console (200) is implemented using computing code stored on a persistent storage that when executed by a processor performs all, or a portion, of the functionality of the power management console (200). The processor may be a hardware processor including circuitry such as, for example, a central processing unit or a microcontroller. The processor may be other types of hardware devices for processing digital information without departing from the invention.

The power management console may manage the power by obtaining workload characteristics (208A) from the IHS devices. The workload characteristics (208A) may be data structures that specify the behavior of the IHS devices in the IHS environment that may be used to estimate power consumption of the IHS devices. Examples of workload characteristics include, but are not limited to: number of users using the computing resources of an IHS device, an amount of revenue brought in by the IHS device, a number of applications executing on an IHS device, a number of transactions per minute performed by the IHS device, and a latency of the IHS device.

The workload characteristics (208A) may be processed using a workload prioritization model (204). In one or more embodiments of the invention, the workload prioritization model (206) is a model that takes workload characteristics (208A) as an input and outputs an assignment of prioritization for each IHS device in the IHS environment. For example, the workload prioritization model (204) may apply weights to each workload characteristic, and measure a value of each of the workload characteristics for an IHS device, apply the respective weights, and, based on the workload characteristics for each IHS device, assign a priority of the IHS device relative to the other IHS devices. The priorities may be based on groupings generated by the workload prioritization model (204). The groupings may be generated in accordance with FIG. 3.1.

In one or more embodiments of the invention, the output of the workload prioritization model may be a device priority group prioritization (208B). In one or more embodiments of the invention, a device priority group prioritization (208B) is a data structure that specifies groupings of IHS devices based on their relative priorities. The device priority group prioritization (208B) may be generated in accordance with FIG. 3.1.

While the workload characteristics (208A) and the device priority group prioritization (208B) are illustrated as being stored in storage (208), the aforementioned data structures may be stored in volatile storage (e.g., memory, cache, etc.) without departing from the invention.

In one or more embodiments of the invention, the power management console (200) manages the power during and after implementation of an emergency power reduction protocol using a power reduction manager (208) may manage an emergency power reduction protocol in accordance with FIG. 3.2.

While the power management console (200) of FIG. 2 has been described and illustrated as including a limited number of specific components for the sake of brevity, a power management console in accordance with embodiments of the invention may include additional, fewer, and/or different components than those illustrated in FIG. 2 without departing from the invention.

Returning to FIG. 2, power management console (200) may provide power management services. FIGS. 3.1-3.2 illustrate methods that may be performed by the power management console (200) of FIG. 2 when providing power management services.

FIG. 3.1 shows a flowchart of a method in accordance with one or more embodiments of the invention. The method depicted in FIG. 3.1 may be used to group IHS devices in accordance with one or more embodiments of the invention. The method shown in FIG. 3.1 may be performed by, for example, a power management console (e.g., 200, FIG. 2).

Other components of the system illustrated in FIGS. 1.1-2 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

Turning to FIG. 3.1, in step 300, workload characteristics are obtained corresponding to each IHS device in an IHS environment. In one or more embodiments of the invention, the workload characteristics are obtained by prompting each IHS to provide the workload characteristics. The IHS devices may provide workload characteristics in response to the prompts. Alternatively, the IHS devices may provide such workload characteristics in a periodic manner.

In step 302, a prioritization is performed on each IHS device in the IHS environment based on the workload characteristics. In one or more embodiments of the invention, the prioritization is performed by applying a workload prioritization model (discussed above) to the workload characteristics to obtain a priority for each IHS device. The priorities may be implemented as relative values that relate the priority of the IHS device to other IHS devices.

In one or more embodiments of the invention, the priorities are obtained by applying weights to each of the workload characteristics based on a configuration by an administrator of the power management console that prefers certain workload characteristics, and the configuration may result in IHS devices associated with such workload characteristics to be highly prioritized.

In step 304, the IHS devices are grouped based on the priorities to obtain a set of priority groups. In one or more embodiments of the invention, the grouping includes identifying IHS devices with similar priorities (e.g., within a predetermined range of values) and assigning an identified of a device priority group to the IHS devices.

In one or more embodiments of the invention, the power management console groups the IHS devices by dividing the workload characteristics based on categories of the workload characteristics. One category may be based on performance metrics. For example, a latency and a number of transactions per minute may be associated with a category based on performance metrics. As another example, a category may be based on business requirements. Workload characteristics such as to the number of users and an amount of revenue of an IHS device may be associated with such category.

In one or more embodiments of the invention, the device priority groups may be further based on the aforementioned categories. For example, a first grouping may be divided into additional device priority groups such that each of the additional device priority groups relate to similar workload characteristics of one of the categories. In this example, a first device priority group may correspond to similar priorities and similar number of users and/or similar revenues.

FIG. 3.2 shows a flowchart of a method in accordance with one or more embodiments of the invention. The method depicted in FIG. 3.2 may be used to manage power in an IHS environment in accordance with one or more embodiments of the invention. The method shown in FIG. 3.2 may be performed by, for example, a power management console (e.g., 200, FIG. 2). Other components of the system illustrated in FIGS. 1.1-2 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

Turning to FIG. 3.2, in step 320, an emergency power reduction protocol is enforced on an IHS environment. In one or more embodiments of the invention, the emergency power reduction protocol reduces the power provided to the IHS environment. For example, the emergency power reduction protocol may include applying an aggressive power limit on all IHSs in the IHS environment. Enforcing the emergency power reduction protocol may further include monitoring the PSUs to determine whether a PSU has restored available power.

In one or more embodiments of the invention, the emergency power reduction protocol is implemented as a result of a power reduction event. For example, a power reduction event may include one or more of the PSUs powering the IHS environment failing to provide power.

In step 322, a determination is made about whether power is available to be provided to the IHS environment. The determination may be based on whether the PSUs can provide power that has not been completely utilized by the IHS devices. Available power may be provided, for example, as a result of a PSUs becoming operational instead of in a failed state. As a second example, the power may be available if, collectively, the IHS devices in the IHS environment are utilizing less power than what has been provided to the IHS environment. If there is power available to be provided to the IHS environment, the method proceeds to step 324; otherwise, the method returns to step 320.

As used throughout this application, an iteration of device processing refers to the process of performing the steps of 324-330 for each device priority group. After all device priority groups are processed, e.g., as determined in step 330 discussed below, a new current iteration of device processing may be initiated.

In step 324, a highest priority device priority group is selected. In one or more embodiments of the invention, the device priority group is selected based on the priorities corresponding to the IHS devices as determined pursuant to the method shown in FIG. 3.1. The device priority group may be unprocessed in the current iteration of device processing.

In step 326, a power usage estimation for the selected device priority group is obtained. In one or more embodiments of the invention, the power usage estimation is a value that estimates the power to be used by the IHS devices in the selected device priority group. The power usage estimation may be processed using the workload characterizations. Further, the power usage estimation may be measured based on obtained information about the power usage of the IHSs prior to implementing the emergency power reduction protocol. The power usage estimation may be based on any other technique without departing from the invention.

In step 328, a power limit is applied to the selected device priority group based on available power and current power consumption on the IHS environment. In one or more embodiments of the invention, the power limit is applied by determining the power limit based on the associated priority of the device priority group. For example, if the device priority group corresponds to a range of high priority, the power limit may not be as aggressive as that of a device priority group associated with a lower priority. The power limit may be specified based on a percentage of the total available power. For example, a power limit of 90% of the total available power may be applied to a higher prioritized device priority group. In contrast a power limit of 50% of the total available power may be applied to a lower prioritized device priority group. The power limits may be based on power limits applied to the other device priority groups (e.g., in the current iteration of device processing).

In one or more embodiments of the invention, the power limit is modified based on the previous power limit, the current power consumption of each of the IHS devices, and the priority of the selected device priority group. For example, if, in a previous iteration of device processing, a power limit has already been applied to the selected device priority group, the power limit may be modified such that it is lowered if the power usage by the IHS environment is higher than what was previously estimated (e.g., based on the power usage estimations of multiple device priority groups). Further, the power consumption may be monitored for each IHS device (or each device priority group) to determine which device priority groups are to have their power limits modified. In this manner, IHS devices that utilize less power than was previously estimated may have their power limit reduced. The reduction of the power limit may allow the power limits of other device priority groups to be increased such that the allowed power usage is increased.

In step 330, a determination about whether all device priority groups have been processed in the current iteration of device processing. If all device priority groups have been processed in the current iteration of device processing, the method proceeds to step 322, and a new current iteration of device processing is initiated. Otherwise, the method proceeds to step 324.

Example

Figure 4:
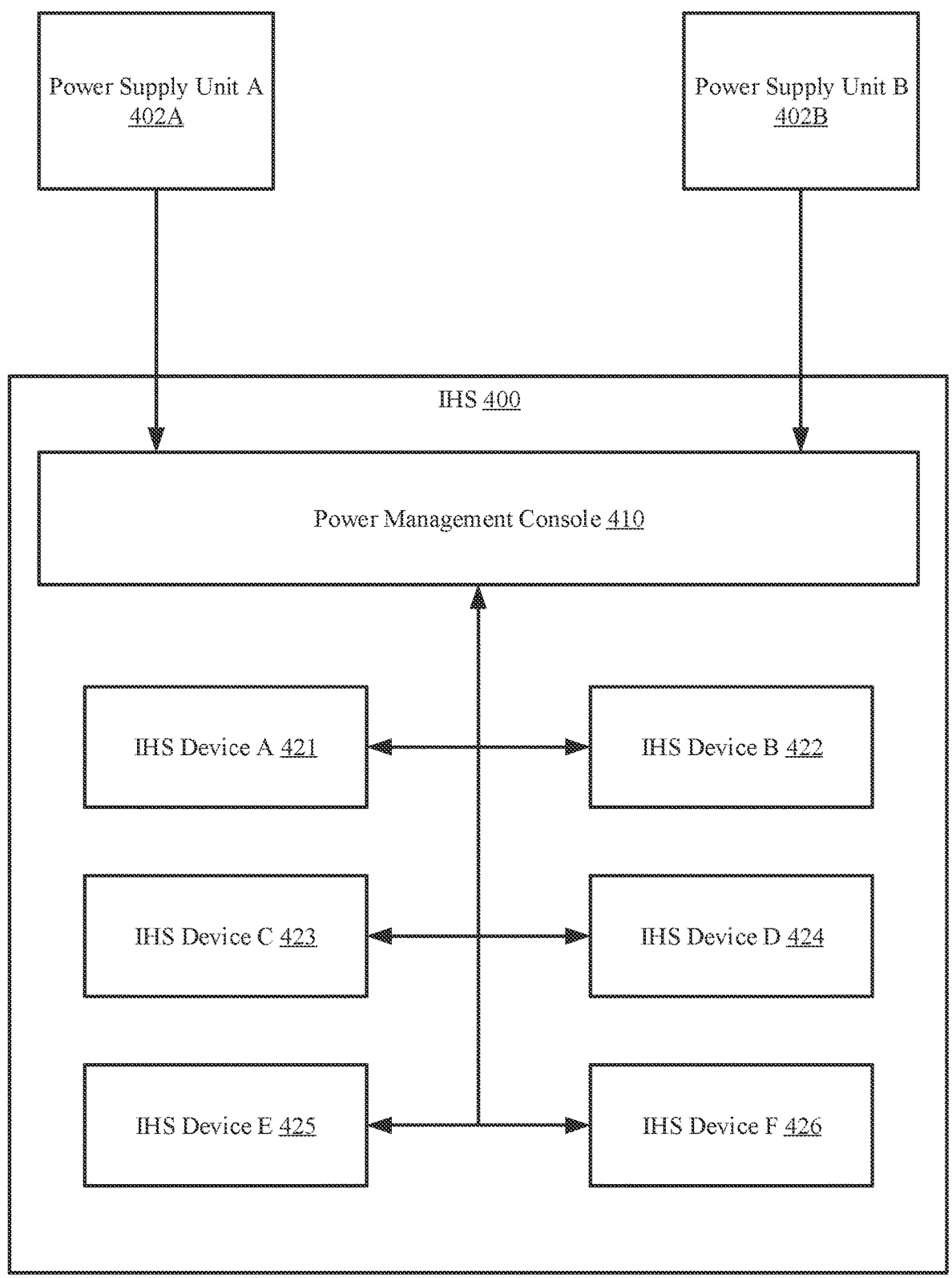
FIG. 4 show an example in accordance with one or more embodiments of the invention.

Consider a scenario as illustrated in FIG. 4 in which a power management console (410) is to be used to manage the power applied to an IHS (400) by two power supply units (PSUs) (402A, 402B). The IHS (400) further includes six IHS devices (421, 422, 423, 424, 425, 426). For a fully operational system, both PSUs (402A, 402B) are providing power to the IHS (400). The power management console (410) manages the power provided to the IHS devices (421, 422, 423, 424, 425, 426). During this time, the power management console (410) prompts the IHS devices (421, 422, 423, 424, 425, 426) to provide workload characteristics regarding to the computing resource usage of the IHS devices (421, 422, 423, 424, 425, 426). Based on this information, IHS devices A (421), C (423), and E (425) are associated with a high priority device priority group; IHS devices B (422) and D (424) are associated with a medium-priority device priority group; and IHS device F (426) is associated with a low priority device priority group.

At a later point in time, PSU B (402B) experiences a failure; PSU A (402A) continues to provide power to the IHS (400). Because the current power demand of the IHS (400) is not met solely by PSU A (402A), the power management console (410) may determine that an emergency power reduction protocol is required. The emergency power reduction protocol includes shutting down power provided to IHS devices C (423), D (424), E (425), and F (426).

At a later point in time, PSU B (402B) becomes operational again, and additional power is available to be provided to the IHS devices (421, 422, 423, 424, 425, 426). The power management console (410), in response to the available power, processes each device priority group to determine a power limit to be applied to each device priority group. In this example, each device priority group is processed sequentially in an order based on their priorities.

The high priority device priority group is processed first. The processing includes measuring a power usage estimation for the three IHS devices (421, 423, 425) and applying a power limit based on the estimated power usage. Prior to the emergency power reduction protocol, this device priority group utilized a large amount of power. Because of the high usage and the high priority of the device priority group, a power limit of 80% of the total available power is applied to the first device priority group.

The second device priority group that includes IHS devices B (422) and D (424) is processed next. The processing includes measuring a power usage estimation for the two IHS devices (422, 424) and applying a power limit based on the estimated power usage. Prior to the emergency power reduction protocol, the second device priority group utilized a large amount of power. Because of the high usage and the medium priority of the device priority group, a power limit of 50% is applied to the second device priority group. The aggressive power limit on the second device priority group is applied to prevent a power surge in the IHS (400).

The third device priority group that includes IHS device F (426) is processed next. The processing includes measuring a power usage estimation for the IHS device (426) and applying a power limit based on the estimated power usage. Prior to the emergency power reduction protocol, the third device priority group utilized a small amount of power. Because of the low usage and the low priority of the device priority group, a power limit of 10% is applied to the third device priority group. Similar to the second device priority group, the aggressive power limit on the third device priority group is applied to prevent a power surge in the IHS (400).

Following the application of the power limits, the power usage of each device priority group is monitored. Based on the monitoring, the power management console (410) determines that the second device priority group utilizes less power than was previously estimated, and that the third device priority group is frequently reaches the power limit during operation. Because of this, the power limits are modified to provide more power to the third device priority group, and increasing the power limit to 20% of the total available power, and reducing the power limit of the second device priority group to 30% of the total available power.

End of Example

Figure 5:
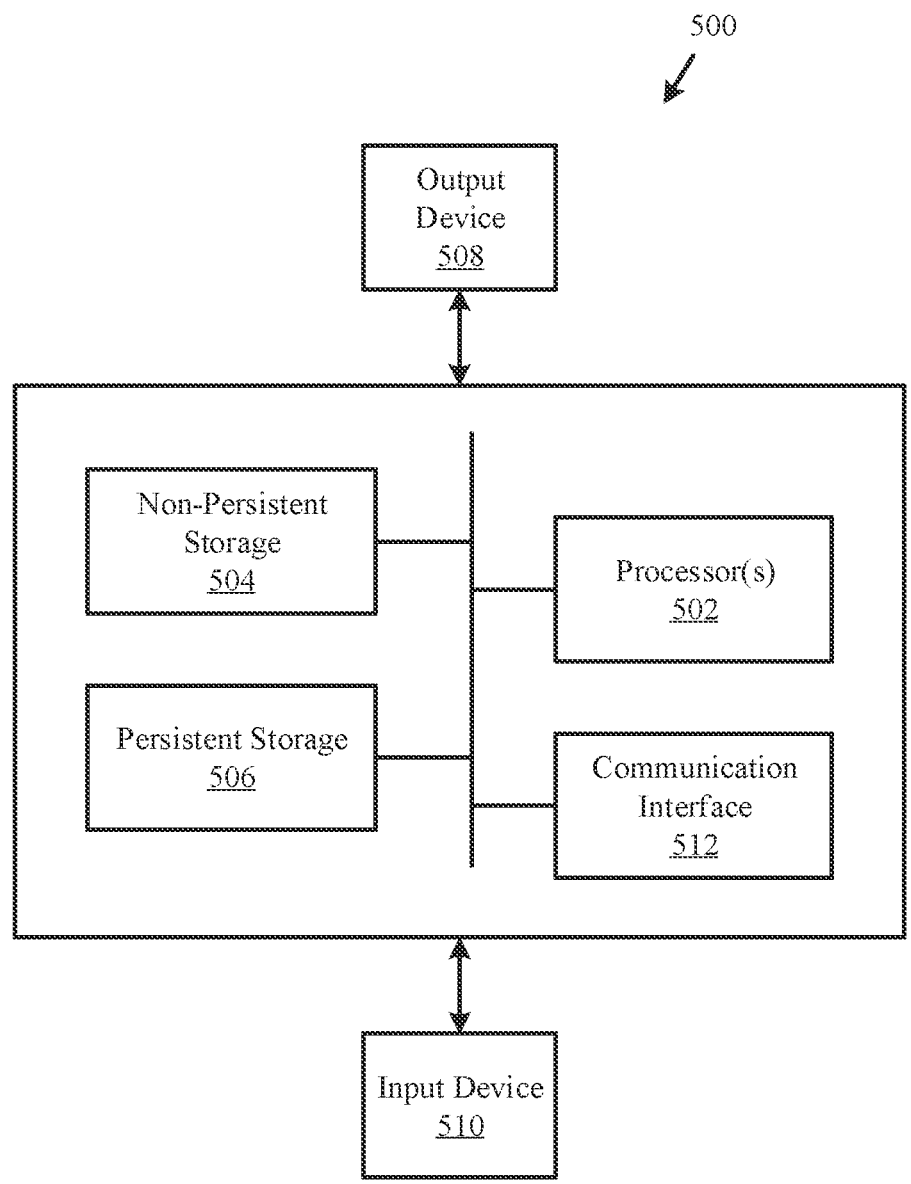
FIG. 5 shows a diagram of a computing device in accordance with one or more embodiments of the invention.

As discussed above, embodiments of the invention may be implemented using a computing device. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide an improved method for managing power provided to an IHS environment. The power may be managed by reducing the possibility of a power surge (or other power-related events) that may damage the IHS devices in the IHS environment. Embodiments of the invention provide a method for staggering the power-on provided to the IHS devices such that the higher prioritized IHS devices are processed first (which may result in power being provided to such IHS devices faster), and a less limiting power limit implemented on those IHS devices so that they may utilize more of the available power without preventing other IHS devices from utilizing available power.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the power management console. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing power provided to an information handling system (IHS) environment, the method comprising:
   initiating, by a power management console, an end to an emergency power reduction protocol on the IHS environment;
   based on the end to the emergency power reduction protocol, selecting a device priority group, wherein:
      the device priority group comprises a plurality of IHS devices, and
      the device priority group is selected based on a priority of the device priority group;
   obtaining a power usage estimation for the device priority group; and
   applying a power limit to the device priority group based on available power to the IHS environment and the power usage estimation.

2. The method of claim 1, further comprising:
   after applying the power limit, making a determination that there is more available power to be provided to the IHS environment;
   based on the determination, selecting a second device priority group, wherein the second device priority group comprises a second plurality of IHS devices, wherein the second device priority group is a lower priority than the device priority group;
   obtaining a second power usage estimation for the device priority group; and
   applying a second power limit to the device priority group, wherein the second power limit is lower than the power limit.

3. The method of claim 1, further comprising:
   after applying the power limit, making a determination that there is more available power to be provided to the IHS environment;
   measuring power usage of the device priority group; and
   based on the determination and based on the power usage, modifying the power limit.

4. The method of claim 3, wherein modifying the power limit comprises increasing an allowed power usage of the device priority group.

5. The method of claim 1, further comprising:
   prior to initiating the end to the emergency power reduction protocol:
      obtaining, by the power management console, workload characteristics corresponding to each of a second plurality of IHS devices, wherein the second plurality of IHS devices comprises the plurality of IHS devices;
      performing a prioritization on each of the second plurality of IHS devices; and
      based on the prioritization, grouping the plurality of IHS devices to obtain the device priority group.

6. The method of claim 1, wherein the power is obtained from a plurality of power supply units (PSUs).

7. The method of claim 6, wherein the emergency power reduction protocol is initiated based on a failure of a PSU of the plurality of PSUs.

8. A non-transitory computer readable medium comprising computer readable program code, which when executed by a computer processor enables the computer processor to perform a method for managing power provided to an information handling system (IHS) environment, the method comprising:
   initiating, by a power management console, an end to an emergency power reduction protocol on the IHS environment;
   based on the end to the emergency power reduction protocol, selecting a device priority group, wherein:
      the device priority group comprises a plurality of IHS devices, and
      the device priority group is selected based on a priority of the device priority group;
   obtaining a power usage estimation for the device priority group; and
   applying a power limit to the device priority group based on available power to the IHS environment and the power usage estimation.

9. The non-transitory computer readable medium of claim 8, wherein the method performed by executing the computer readable program code further comprises:

after applying the power limit, making a determination that there is more available power to be provided to the IHS environment;

based on the determination, selecting a second device priority group, wherein the second device priority group comprises a second plurality of IHS devices, wherein the second device priority group is a lower priority than the device priority group;

obtaining a second power usage estimation for the device priority group; and applying a second power limit to the device priority group, wherein the second power limit is lower than the power limit.

10. The non-transitory computer readable medium of claim 8, wherein the method performed by executing the computer readable program code further comprises:

after applying the power limit, making a determination that there is more available power to be provided to the IHS environment;

measuring power usage of the device priority group; and based on the determination and based on the power usage, modifying the power limit.

11. The non-transitory computer readable medium of claim 10, wherein modifying the power limit comprises increasing an allowed power usage of the device priority group.

12. The non-transitory computer readable medium of claim 8, wherein the method performed by executing the computer readable program code further comprises:

prior to initiating the end to the emergency power reduction protocol:

obtaining, by the power management console, workload characteristics corresponding to each of a second plurality of IHS devices, wherein the second plurality of IHS devices comprises the plurality of IHS devices;

performing a prioritization on each of the second plurality of IHS devices; and based on the prioritization, grouping the plurality of IHS devices to obtain the device priority group.

13. The non-transitory computer readable medium of claim 8, wherein the power is obtained from a plurality of power supply units (PSUs).

14. The non-transitory computer readable medium of claim 13, wherein the emergency power reduction protocol is initiated based on a failure of a PSU of the plurality of PSUs.

15. A system, comprising:

an IHS environment comprising a plurality of IHS devices;

a plurality of power supply units (PSUs); and a power management console, wherein the power management console is programmed to:

initiate an end to an emergency power reduction protocol on the IHS environment;

based on the end to the emergency power reduction protocol, select a device priority group, wherein:

the device priority group comprises the plurality of IHS devices, and the device priority group is selected based on a priority of the device priority group;

obtain a power usage estimation for the device priority group; and apply a power limit to the device priority group based on available power to the IHS environment and the power usage estimation.

16. The system of claim 15, wherein the power management console is further programmed to:

after applying the power limit, make a determination that there is more available power to be provided to the IHS environment;

based on the determination, select a second device priority group, wherein the second device priority group comprises a second plurality of IHS devices, wherein the second device priority group is a lower priority than the device priority group;

obtain a second power usage estimation for the device priority group; and apply a second power limit to the device priority group, wherein the second power limit is lower than the power limit.

17. The system of claim 15, wherein the power management console is further programmed to:

after applying the power limit, make a determination that there is more available power to be provided to the IHS environment;

measure power usage of the device priority group; and based on the determination and based on the power usage, modify the power limit.

18. The system of claim 17, wherein modifying the power limit comprises increasing an allowed power usage of the device priority group.

19. The system of claim 15, further comprising:

prior to initiating the end to the emergency power reduction protocol:

obtaining, by the power management console, workload characteristics corresponding to each of a second plurality of IHS devices, wherein the second plurality of IHS devices comprises the plurality of IHS devices;

performing a prioritization on each of the second plurality of IHS devices; and based on the prioritization, grouping the plurality of IHS devices to obtain the device priority group.

20. The system of claim 15, wherein power provided to the IHS environment is obtained from a plurality of power supply units (PSUs).

* * * * *